H. LEMON & J. A. CAMERON.
Sectional-Core to be used in the Manufacture of Tubing.
No. 168,755. Patented Oct. 11, 1875.
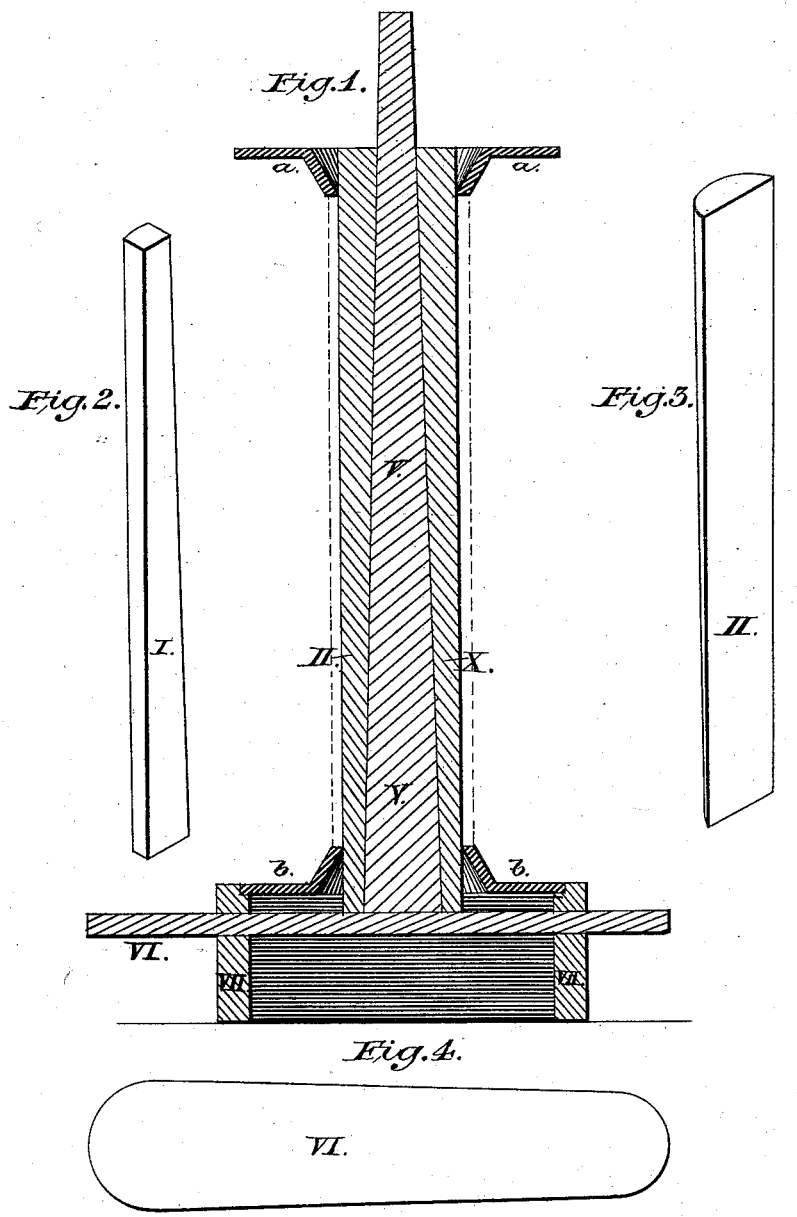

UNITED STATES PATENT OFFICE.

HANS LEMON AND JAMES A. CAMERON, OF MEMPHIS, TENNESSEE.

IMPROVEMENT IN SECTIONAL CORES TO BE USED IN THE MANUFACTURE OF TUBING.

Specification forming part of Letters Patent No. 168,755, dated October 11, 1875; application filed June 9, 1875.

*To all whom it may concern:*

Be it known that we, HANS LEMON and JAMES A. CAMERON, all residing in the city of Memphis, county of Shelby and State of Tennessee, have invented an Adjustable Sectional Core, to be used in the manufacture of any kind of tubing, such as chimney-flues, chimney-caps, sewage-pipes, manufactured from any plastic material, of which the following is a specification:

This core is one tapering or wedge-shaped piece in its center, surrounded by other pieces so shaped that when adjusted around this middle portion they will all form a complete core in size and proportion to conform to any shape of the inside of the tubing desired.

This core is placed at its lower end in a metallic rim, to hold its sections in place, and this rim sets in a frame; and in this frame, and directly under the hole in rim for the core to rest upon, a bar, or wedge, or key is placed, so that when the tubing is manufactured and ready to remove the core, the wedge in the frame is knocked out, thus freeing the core at its bottom, and as the middle section of the core is larger at the bottom end than at the top, a slight knock will make it fall out of the other sections of the core and fall below as the mold is elevated sufficiently for them to do so. This center having dropped out, the other sections are freed, and fall into the space created by the falling out of the middle piece, and they also fall toward the center and below. There is a top metallic rim that is placed on the top of the mold after the mold is filled. These top and bottom rims have a double purpose, that of holding the core in position, and also to form a flange at one end, and a counter-flange at its other end, or any other finish of the tubes at their ends desired.

The drawings, to which reference is made, and considered a part of these specifications, are Figure 1, a transverse sectional view; Fig. 2 is a cross-section of the same.

*a*, the upper plate to hold the core in position, and to shape that end of tube; *b*, the lower plate, also to hold the core in position and to shape that end of tube; V, the center part of core; I and III, outside sectional parts of core; II and X, other outside sectional parts of core; VI, a bar or wedge or key; VII, a frame, on which rests the base of core. *a* and *b* can be constructed as here described, or the flange may be otherwise shaped, or as is the case when a chimney-top is made to be set on brick-work. Their shape is not essential, as long as it retains the core in position while being used and to finish the ends of tubing. They can be either made of metal or wood. V, the center part of core, is made tapering, the larger end being at the base of the mold, so it can be driven out easily. I and III are made tapering on their inside to conform to the angle of V, the center part of core, and are also tapering on their two sides that conform to the angles of II and X, on the other two outside sections of this core. The outside parts of these sections, I, III, II, and X, are so shaped as to conform to any shape of the inside of the tubing to be made. VI, the bar or wedge or key, is made tapering, and is held in position directly under plate *b* in the frame VII, that plate *b* sets in, by two slots cut in opposite sides of frame VII.

We do not confine ourselves to any special shape of the frame. It might be constructed round, octagonal, or any other shape.

We do not claim the originality of making a core for plastic material; but

What we do claim is—

A core for tubing, consisting of a square tapering center, V, and four tapering side pieces, I, II, III, and X, in combination with the finishing-plates *a* and *b* and the bar-wedge VI, all constructed to operate substantially as and for the purpose set forth.

HANS LEMON.
JAMES A. CAMERON.

Witnesses:
JNO. W. CLARK,
DAVID M. PHILP.